Nov. 21, 1967   H. C. SCHULZE   3,353,214

APPARATUS FOR COMPACTING PARTICULATE MATERIAL

Filed Oct. 30, 1964   2 Sheets-Sheet 1

INVENTOR.
HERBERT C. SCHULZE
BY Fulwider, Patton, Rieber,
Lee and Utecht
ATTORNEYS Nov. 21, 1967   H. C. SCHULZE   3,353,214
APPARATUS FOR COMPACTING PARTICULATE MATERIAL
Filed Oct. 30, 1964   2 Sheets-Sheet 2
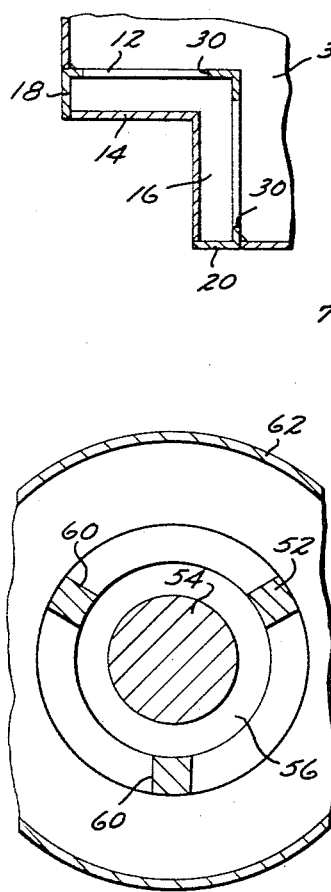
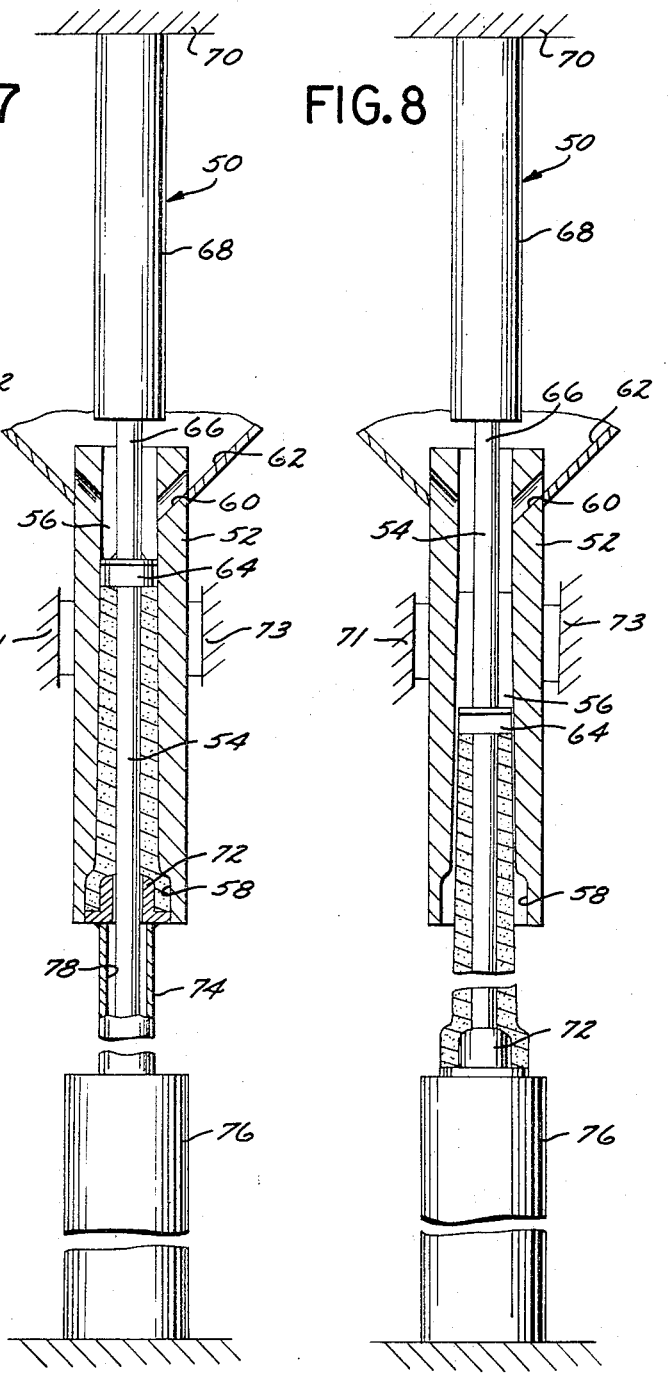
INVENTOR.
HERBERT C. SCHULZE
BY Fulwider Patton, Rieber,
Lee and Utecht
ATTORNEYS

United States Patent Office 3,353,214
Patented Nov. 21, 1967

3,353,214
APPARATUS FOR COMPACTING PARTICULATE
MATERIAL
Herbert C. Schulze, 3690 Highland Drive,
Carlsbad, Calif. 92008
Filed Oct. 30, 1964, Ser. No. 407,700
1 Claim. (Cl. 18—16.5)

ABSTRACT OF THE DISCLOSURE

This is an apparatus for the compacting of particulate material, particularly clay and such items, in which the materials are encased within a solid shell with a solid core extending through the shell. The material is compacted by a combination of vibration and the movement of the core through the material constantly with a compacting member attached to the core during its movement.

---

The present invention relates to an apparatus for compacting particulate material, and more particularly to an apparatus for compacting relatively dry particulate material having the capacity for adhering to itself under pressure.

It is relatively commonplace to compress or compact particulate materials such as granules of plastic substances, powdered metals, granules of clay and the like to form relatively small parts. However, there is no completely satisfactory and economical means known for effecting adequate compaction of parts having a relatively large dimension along the axis of compression. For example, it is common practice to compact clay granules into parts having a 6-inch length but beyond that point, and certainly up to lengths of 5 and 6 feet, satisfactory compaction has not heretofore been achieved. The lack of uniform density is theorized to be the result of loss of compaction forces through friction and binding of the material against the mold faces lying parallel to the axis of compression.

Thus, in a conventional two-part mold in which a stationary mold part receives the particulate material and a movable part is disposed over the material and urged downwardly against it to compress it, the material apparently tends to frictionally engage the mold surfaces along the axis of compression and forms "bridges" of material through which it is impossible to efficiently transmit the compression forces necessary to compact the material beyond the "bridge," and particularly material at the very bottom of the mold cavity. This unsatisfactory condition is aggravated as the length of the mold cavity increases along the axis of compression. A specific example is the formation of a two-foot length of clay pipe having a 5½ inch outer diameter and a 4 inch inner diameter. With present apparatus it is impractical to even attempt to compress the ¾ inch wall thickness axially over a length of more than a few inches, and compression of such material in lengths measuring several feet is practically unheard of. It is understood that certain isostatic methods are capable of forming such lengths of pipe, but the costs of the apparatus are apparently prohibitive.

The difficulties described in connection with the compaction of relatively deep or long parts through the use of known compacting methods and apparatus applies to particulate materials in general, including clay granules, cement-asbestos fiber mixtures, earth, granules of plastic material such as tetrafluoroethylene and polyethylene, and powdered metals such as bronze and the like for producing sintered parts. Accordingly, the term "particulate material" should be construed broadly to include these and any like material capable of adhering to itself under pressure.

Lacking any satisfactory means to form long sections of clay pipe by compaction of comparatively dry clay granules, the clay pipe industry has been compelled to use other pipe formation processes, such as extrusion of very wet clay into the desired pipe forms followed by comparatively long drying periods to remove most of the moisture prior to firing. Such excess moisture has to be removed to prevent cracking and flaking of the pipe during firing. However, the preliminary drying step adds to the pipe cost and greatly slows the production cycle. Compaction of relatively dry clay, that is, having a moisture content of less than 10%, would completely eliminate any need for a pre-firing drying step and is therefore greatly to be desired.

Accordingly, it is an object of the present invention to provide an apparatus adapted for compacting particulate material into parts of substantially uniform density and having relatively deep or long sections along the axis of compression. It is a related object of the invention to provide compaction of relatively dry clay granules for forming elongated pipe sections ready for immediate firing.

The prior art methods and processes for compaction of particulate materials also suffer the disadvantage of undue parts breakage on removal from the mold. Thus, in the formation of a cylindrical part according to known methods, a cylindrical mold and a central core are utilized to provide the mold cavity, and the central core moved out of the cylindrical mold after compaction is completed. The formed cylindrical item is next forced out of the stationary mold and at this point it frequently collapses into the hollow central opening left on removal of the mold core.

Therefore, it is an object of the present invention to provide an apparatus for compacting particulate material and in which a pair of mold parts comprising a sleeve and a core are employed for forming an elongated cylindrical body, the sleeve being separated from the compressed material prior to separation of the core to thereby prevent inward collapse of the freshly compressed material and facilitate subsequent removal of the core. In this regard, the compressed material has a certain elasticity so that when the sleeve is removed the material tends to expand outwardly and away from the core, making removal of the core easier and without damage to the part. With this apparatus the central core can also be utilized as a carrier for supporting the molded part during its transport from the sleeve mold to the next work station.

Another object of the invention is to provide an apparatus adapted to effect compaction of an elongated part from both ends to thereby insure uniform density of compaction. It is a related object of the invention to provide an apparatus of the aforementioned character which includes a cylindrical first mold part, and a central core or second mold part defining a mold cavity with the first mold part, and in which particulate material in the mold cavity is compressed from one end by a pressing member and from the other end by a retaining member, the retaining member being urged against the particulate material by a cylinder characterized by a hollow piston rod for slidably receiving the second mold part. With this arrangement, the material is not only compressed from both ends, but the mold parts are guided in the separate movement occurring upon removal of the formed part. Proper alignment between the second mold part and the central opening or bore in the piston rod of the cylinder actuating the retaining member is facilitated by providing the end of the second mold part with a point. Any slight misalignment is then corrected by the self-centering action of the point upon its entry into the piston rod opening.

It is another object of the invention to provide apparatus of the aforementioned character in which the mold parts defining the substantially longitudinally oriented faces of the mold cavity undergo relative movement along a longitudinally oriented axis of compaction whereby the material to be compacted tends to move with one of the mold parts in the direction of compaction to facilitate transmission of compaction forces throughout the body of the material.

Other objects and features of the invention will become apparent from consideration of the following description taken in connection with the accompanying drawings, in which:

FIG. 4 is an enlarged view taken along the line 4—4 of FIG. 3;

FIG. 6 is an enlarged view taken along the line 6—6 of FIG. 5;

FIG. 7 is a view similar to FIG. 5, but showing the relative location of the various components upon completion of the compaction operation; and FIG. 8 is a view similar to FIG. 5, but showing the relative location of the components upon removal of the formed part from the mold cavity.

Figure 1:
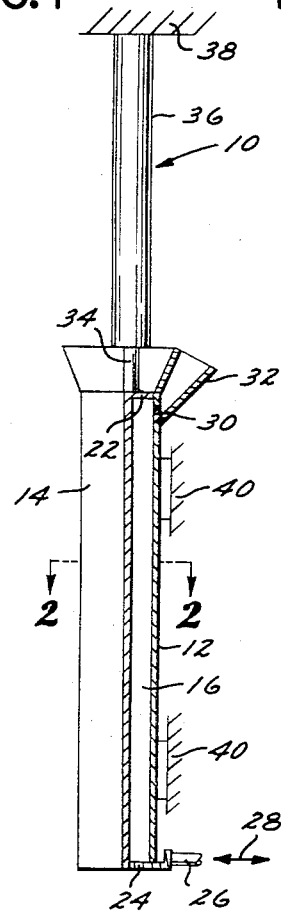
FIG. 1 is a side elevational view, partially in section, illustrating one embodiment of an apparatus for compacting particulate material according to the present invention.
Figure 2:
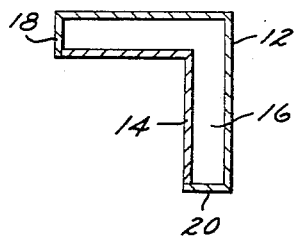
FIG. 2 is an enlarged view taken along the line 2—2 of FIG. 1.

Referring now to the drawings, and particularly to FIGS. 1 and 2, there is illustrated an apparatus 10 for compacting particulate material such as granules of clay, mixtures of cement and asbestos fibers, granules of plastic materials such as tetrafluoroethylene or polyethylene, powdered metals such as bronze powder, or any other particulate material constituted of particles adapted to adhere to one another under pressure. The mold cavity may take a variety of configurations, and the configurations described hereinafter are merely exemplary. Thus, the apparatus 10 includes a pair of elongated mold parts constituted by an outer angle 12 and an inner angle 14 which are spaced apart, as best illustrated in FIG. 2, to define an elongated mold cavity 16 having a right angular configuration. The mold cavity 16 is adapted to receive particulate material (not shown) for compaction along its longitudinal axis.

The legs of the inner angle 14 are shorter than the corresponding legs of the outer angle 12 and the spaces between the edges of the legs are bridged by a pair of elongated mold flanges 18 and 20, which are each secured along one of its longitudinal edges, as by welding or the like, to the adjacent longitudinal edges of the outer angle 12. The unsecured or free edges of the flanges 18 and 20 are longitudinally slidable with respect to the adjacent longitudinal edges of the inner angle 14. Thus, the mold cavity 16 is closed on all sides and open at both ends.

The upper end of the mold cavity 16 is closed by a flat, horizontally oriented pressing plate or member 22 having a right angular shape and secured at the inner margins of its legs to the upper edges of the inner angle 14, as by welding. The opposite or outer edge margins of the legs of the right angular pressing member 22 lie within the mold cavity 16 and are adapted for longitudinally slidable movement along the adjacent inner faces of the outer angle 12. Thus, downward movement of the inner angle 14 and the pressing member 22 urges any particulate matter in the mold cavity 16 toward the lower end of the cavity.

The lower end of the mold cavity 16 is closed by a second flat, horizontally oriented plate or member 24 which, because it resists compaction forces, also constitutes a form of pressing member. However, it will be referred to herein as the retaining member 24 to distinguish it from the member 22. The retaining member 24 is substantially identical in configuration to the pressing member 22 except that it includes a lateral projection to which an actuating rod 26 is secured. The retaining member 24 normally slidably engages the lower end of the outer angle 12 and abuts against the inner, mold defining faces of the inner angle 14. However, the retaining member 24 is not secured to either of the angles 12 or 14 but rather is laterally slidable to uncover the lower end of the mold cavity 16 to permit removal of the formed part, as will be seen. For this purpose, the actuating rod 26 may be operated to slide the retaining member 24 laterally in the direction of the arrows 28 in FIG. 1.

The actuating rod 26 may be operated by any suitable mechanism (not shown) such as by a piston rod of a hydraulic cylinder, but the particular means for operating the rod 26 are omitted for brevity since various suitable mechanisms for accomplishing the lateral or transverse movement of the rod 26 will immediately suggest themselves to those skilled in the art.

The upper extremity of the outer angle 12 is provided with a pair of openings 30, as best viewed in FIG. 4, for receiving particulate matter for compaction within the mold cavity 16. Such material is guided into the openings 30 by a funnel 32 which is welded or otherwise secured to the outer angle 12. The outer end of the funnel 32 is adaped to receive material for compaction and its sloping sides guide such material through the openings 30 and into the cavity 16.

The pressing member 22 and the upper end of the inner angle 14 are rigidly secured, as by welding or the like, to the lower end of a piston rod 34 forming a part of a usual and conventional hydraulic cylinder 36.

The upper end of the cylinder 36 is fixed to any suitable structure, as indicated diagrammatically at 38, and the outer angle 12 is similarly secured to any suitable fixed structure, as indicated in two places by the numeral 40 in FIG. 1. Although not shown, the fixed structure is preferably a suitable framework for maintaining the cylinder 36 and outer angle 12 in fixed position relative to the inner angle 14.

In operation, particulate matter such as granules of relatively dry clay are loaded into the funnel 32 for discharge into the mold cavity 16. With the retaining member 24 in the position illustrated in FIG. 1, the cylinder 36 is actuated to move the inner angle 14 along an axis of compaction parallel to the longitudinal axis of the mold cavity 16, compacting the clay granules between the pressing member 22 and the retaining member 24.

It is theorized that movement of that longitudinal face of the inner angle 14 which defines one side of the mold cavity 16 tends to carry the clay granules downwardly with it, thereby reducing shear and friction of such granules within the mold cavity and facilitating transmission of the compaction forces throughout the body of the clay granules. Whatever the reason, it has been found that by moving a face of the mold cavity long the axis of compaction and at the same rate, it is possible to form elongated articles of substantially uniform density and in lengths in excess of 2 feet. In the present example, of course, the formed parts are right angular in configuration, but a variety of configurations or cross sections are formable by using appropriately configured mold parts, as previously indicated.

Upon completion of compaction, the actuating rod 26 is operated to move the retaining member 24 and thereby uncover the lower end of the mold cavity 16 to permit the molded part to be moved out of the mold cavity upon continued downward movement of the pressing member 22. As will be apparent to those familiar with the molding art, appropriate means (not shown) would be provided for receiving the molded part as it is discharged from the mold cavity 16. In this regard, it has been found that by utilizing a mold part, such as the inner angle 14, which is movable in the direction of compaction at the same rate as the rate of compaction, the molded part is more easily removed from the mold cavity. That is, the molded part is carried out of the mold cavity by what is, in effect, half of the mold so that the molded part shears away from only half the mold during such removal. Upon removal from the mold, the inherent elasticity of the molded part is such that there is a natural tendency of the molded part to expand and tend to separate from the inner angle 14 with which it is associated upon passage of the part from the mold cavity 16.

It will be apparent that although reference has been made to a stationary outer angle 12 and a movable inner angle 14, the inner angle 14 could just as easily have been fixed and the outer angle 12 provided with the capability for longitudinal movement.

Figure 3:
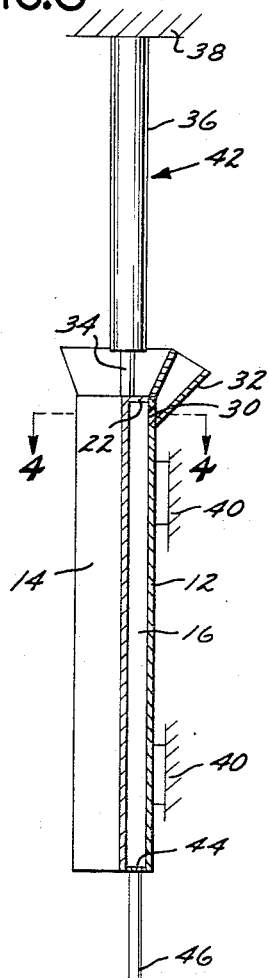
FIG. 3 is a side elevational view, partially in section, illustrating another embodiment of the invention, this embodiment being similar to that shown in FIG. 1 except that the retaining member is adapted for imparting a compacting force.

Referring now to FIGS. 3 and 4, an apparatus 42 is illustrated which is substantially identical to the apparatus 10 except for the provision for additional compaction at the lower end of the mold cavity. Like reference numerals are used for like parts throughout the following description. Thus, instead of utilizing a retaining member 24 adapted for lateral movement, a flat, horizontally oriented right angular retaining member 44 is employed which is adapted to closely fit within the right angular configuration of the mold cavity 16 and longitudinally slide upwardly within the mold cavity to compact the particulate matter in an upward direction, as viewed in FIG. 3. For this purpose, the retaining member 44 is secured to the piston rod 46 of a usual and conventional hydraulic cylinder 48 whereby operation of the cylinder 48 effects the desired compaction by the retaining member 44.

Compaction by the retaining member 44 can be made simultaneous with compaction by the pressing member 22, or the pressing member 22 may be first operated to effect its compaction, followed by actuation of the retaining member 44 to effect its compaction. As will be apparent, the provision of what amounts to two pressing members 22 and 44 provides additional assurance of uniform density throughout the molded part, particularly when the part has a relatively large dimension along the axis of compression.

In the foregoing description reference has been made to hydraulic cylinders for actuating the pressing and retaining members, but it will be apparent that such specificity is only for convenience and that any means is satisfactory which will provide the desired movement of these members, including air cylinders, gear drives, or the many other motion producing means known to those skilled in the art.

Referring now to FIGS. 5 through 8, there is illustrated an apparatus 50 which is particularly adapted to form an elongated pipe having an enlarged end portion or bell. Although illustrated for operation along a vertical axis, it will be apparent that the apparatus 50 can easily be adapted for orientation in any position required by the particular application. The apparatus 50 comprises, generally, an elongated cylindrical outer mold part or sleeve 52, and an elongated mold part, mandrel or core 54 which is longitudinally movable within the hollow interior of the sleeve 52. The core 54 defines with the sleeve 52 an elongated mold cavity 56 which is cylindrical and of uniform cross section except for a tapered portion to be described, and except for an enlarged portion forming a bell cavity 58 at the lower ends of the mold parts.

As best viewed in FIG. 8, the central bore of the sleeve 52 is preferably formed so that it gradually increases in cross section in a downward direction to provide a tapered portion which facilitates separation of the molded part from the cavity 56, as will subsequently be described in greater detail. In addition, it is believed that the taper enhances compaction because it provides a downwardly increasing area within which the material can travel during compaction.

Figure 5:
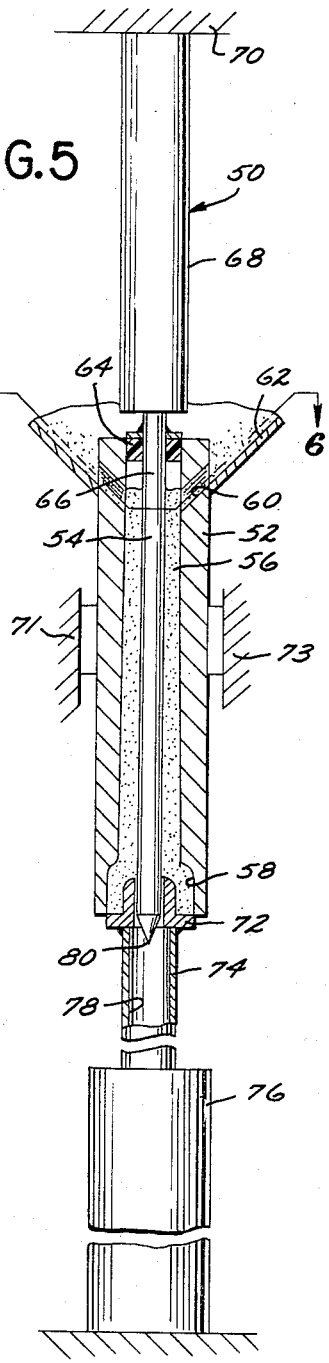
FIG. 5 is yet another embodiment of the present invention, this embodiment being particularly adapted to form elongated clay pipe having an enlarged end or bell, and being shown with the various components in their loading positions.

The upper extremity of the sleeve 52 is provided with a plurality of radial slots 60, as best viewed in FIGS. 5 and 6, for receiving particulate matter for loading the mold cavity 56. The slots 60 are surrounded by a conical funnel 62 which is welded or otherwise secured to the sleeve 52 immediately below the slots 60. The upper end of the funnel 62 is open to receive material to be compacted, discharging such material into the mold cavity 56.

The open-ended mold cavity 56 is closed at its upper end by an annular pressing ring or member 64 welded or otherwise rigidly secured to the core 54 and longitudinally slidable within the mold cavity 56. The pressing member 64 is preferably made in two parts, the upper part being a backing plate made of metal and the lower part being an annular ring of low friction material such as tetrafluoroethylene or nylon.

The pressing member 64 is welded or otherwise rigidly secured to the lower end of a piston rod 66 which forms a part of a usual and conventional hydraulic cylinder 68. The upper end of the cylinder 68 is secured to any suitable fixed structure 70, and the sleeve 52 is similarly fixed, as by securement at 71 and 73 to a suitable stationary structure. Preferably the stationary structure constitutes a frame for all of the various components of the apparatus 50.

The lower end of the mold cavity 66, and more particularly the bell cavity 58, is closed by a centrally bored, cylindrical pressing member 72 having a circumferential flange in slidable engagement with the adjacent inner circumferential surface of the sleeve 52. The central bore in the pressing member 72 slidably accommodates the core 54 so that the core is longitudinally movable independently of the pressing member 72. As will be apparent from the showing in FIG. 7, the configuration of the pressing member 72 is such that the conventional clay pipe bell shape is provided by the bell cavity 58.

The pressing member 72 is welded or otherwise rigidly secured to the upper end of a tubular piston rod 74 forming a part of a hydraulic cylinder 76 which is conventional in every respect except that the piston rod thereof includes a central bore 78 to accommodate the core 54 during its longitudinal movement relative to the piston rod 74. With this arrangement the pressing member 72 is operable to provide compaction in an upward direction, which is desirable to assure uniform particle density in the larger bell section of the formed pipe.

In operation, the apparatus 50 is loaded with particulate matter, in this case granules of shale clay or clay mixtures having a low moisture content, and the clay granules are discharged into the mold cavity 56 with the various components of the apparatus 50 disposed in the loading positions shown in FIG. 5.

After the cavity 56 is filled to the level shown in FIG. 5, the pressing member 64 is operated in a downward direction to effect compaction of the clay granules, such compaction continuing to the point illustrated in FIG. 7, at which point the pressing member 64 is aligned with the beginning of the downwardly tapered portion of the mold cavity 56. Movement of the pressing member 64 thus occurs in the same direction and at the same rate as the core 54.

Preferably after the downward movement of the pressing member 64 is complete, the pressing member 72 is operated to upwardly compact the clay granules, particularly in the area of the bell cavity 58, as best illustrated in FIG. 7.

Next, the cylinder 68 is again operated to move the pressing member 64 further in a downward direction and, simultaneously, fluid in the cylinder 76 is allowed to freely discharge so that the downward movement of the pressing member 64 is accompanied by simultaneous downward movement of the pressing member 72. The formed part separates relatively easily from the mold cavity 56 by reason of the previously described taper provided on the inner face of the sleeve 52. The peripheral flange of the pressing member 72 serves as a platform or support for the formed part as it moves downwardly and out of the mold cavity 56. Downward movement of the molded part continues beyond the position illustrated in FIG. 8, the cylinder 76 and other portions being shown fore-shortened for brevity, it being noted that during ejection of the part from the mold cavity the part is prevented from collapsing upon itself toward its hollow center by the presence of the supporting core 54. After separation of the part from the sleeve 52 is complete, the core 54 is then withdrawn, leaving the formed part on the member 72 for removal and firing.

In each of the above embodiments the structure which defines the mold cavity includes a pair of confronting mold parts and a third element which is movable over one of the mold parts and into the cavity to compact particulate material in the cavity. Thus, in the apparatus 50, the pair of confronting mold parts are constituted by the sleeve 52 and the core 54, and the third or compacting element is constituted by the pressing member 64, the member 64 being movable into the cavity over the sleeve 52. The various embodiments above-described also include some means for contemporaneously moving the third element or pressing member and the mold part which confronts the mold part over which the pressing member passes. With this arrangement, one of the mold parts moves with the pressing member to better compact the particulate material in the mold cavity, as above-described.

The lower end of the core 54 is provided with a pointed portion 80 to facilitate entry of the core 54 into the central bore of the pressing member 72 when the components of the apparatus are again oriented in the loading positions illustrated in FIG. 5.

Apparatus substantially identical to apparatus 50 has been used to produce clay pipe in lengths up to 6 feet. Shale clay granules were used having a moisture content of approximately 10 percent by weight, and the pipe produced had a 4 inch inside diameter and an average 5½ inch outer diameter. The taper in the mold parts provided an increase in diameter of approximately 1/16 inch from one end of the tapered portion to the other. 70,000 pounds compression force was applied by the pressing member 64.

From the foregoing, it will be apparent that a rapid and efficient means has been provided for compacting particulate material into parts having comparatively great depth or length along the axis of compression. The apparatus described is particularly adapted for the compaction of clay granules to form clay pipe, completely eliminating any need for drying periods prior to firing.

Various modifications and changes may be made with regard to the foregoing detailed description without departing from the spirit of the invention or the scope of the following claim.

I claim:

Apparatus for compacting particulate material, said apparatus comprising:

an elongated, relatively fixed cylindrical sleeve having first and second ends and further having a portion of the central opening thereof progressively larger toward said first end to define a taper, and having said first end further enlarged;

an elongated core for location within said opening to define therewith an elongated open-ended cylindrical mold cavity having an enlarged bell portion adjacent said first end, said mold cavity being adapted for receiving particulate material, said core having a length at least the full length of said mold cavity;

an annular pressing member fixedly connected to said core for closing the end of said mold cavity adjacent said second end of said sleeve;

an annular retaining member for closing the end of said mold cavity adjacent said first end of said sleeve and including a centrally bored, generally hemispherical portion for projection into said bell portion of said mold cavity, the central bore of said retaining member being adapted to axially slidably receive an extremity of said core;

first means operable for axially moving said core and said annular pressing member toward said first end for compacting particulate material in said mold cavity;

and second means operable for axially moving said annular retaining member toward said second end for compacting particulate material in said bell portion of said mold cavity, said first means being adapted for ejecting molded material from said first end of said sleeve when said second means is rendered inoperable whereby said molded material parts from said taper of said mold cavity and passes out of said mold cavity with the adjacent portion of said core, and rests upon said retaining member.

References Cited

UNITED STATES PATENTS

| 1,433,300 | 10/1922 | Quillet | 25—45 |
| 2,090,784 | 8/1937 | Davis | 25—45 X |
| 2,122,874 | 7/1938 | Whipple | 25—45 X |
| 2,122,960 | 7/1938 | Schwartzwalder | 18—16.5 X |
| 2,357,407 | 9/1944 | Kurtz | 18—16.5 X |
| 2,380,659 | 7/1945 | McDougal | 25—91 X |
| 2,398,227 | 4/1946 | Hubbert | 18—16.5 |
| 2,562,876 | 8/1951 | Baeza | 18—16.5 |
| 2,675,581 | 4/1954 | Payne | 25—91 X |
| 2,762,078 | 9/1956 | Haller | 18—16.5 |
| 2,983,021 | 5/1961 | Maillard | 25—30 X |
| 3,000,070 | 9/1961 | Gagne | 25—30 X |
| 3,020,589 | 2/1962 | Maritano | 18—16.5 |
| 3,119,165 | 1/1964 | Gourlie | 25—30 |
| 3,165,794 | 1/1965 | Johnston | 25—35 X |
| 3,200,465 | 8/1965 | Lassman | 18—16.5 X |
| 3,255,497 | 6/1966 | Johnston | 25—35 X |

FOREIGN PATENTS 28,648  8/1931  Australia.

J. SPENCER OVERHOLSER, Primary Examiner.

J. HOWARD FLINT, Jr., Examiner.